3,505,125
REUSABLE MOLTEN METAL TEMPERATURE MEASURING APPARATUS

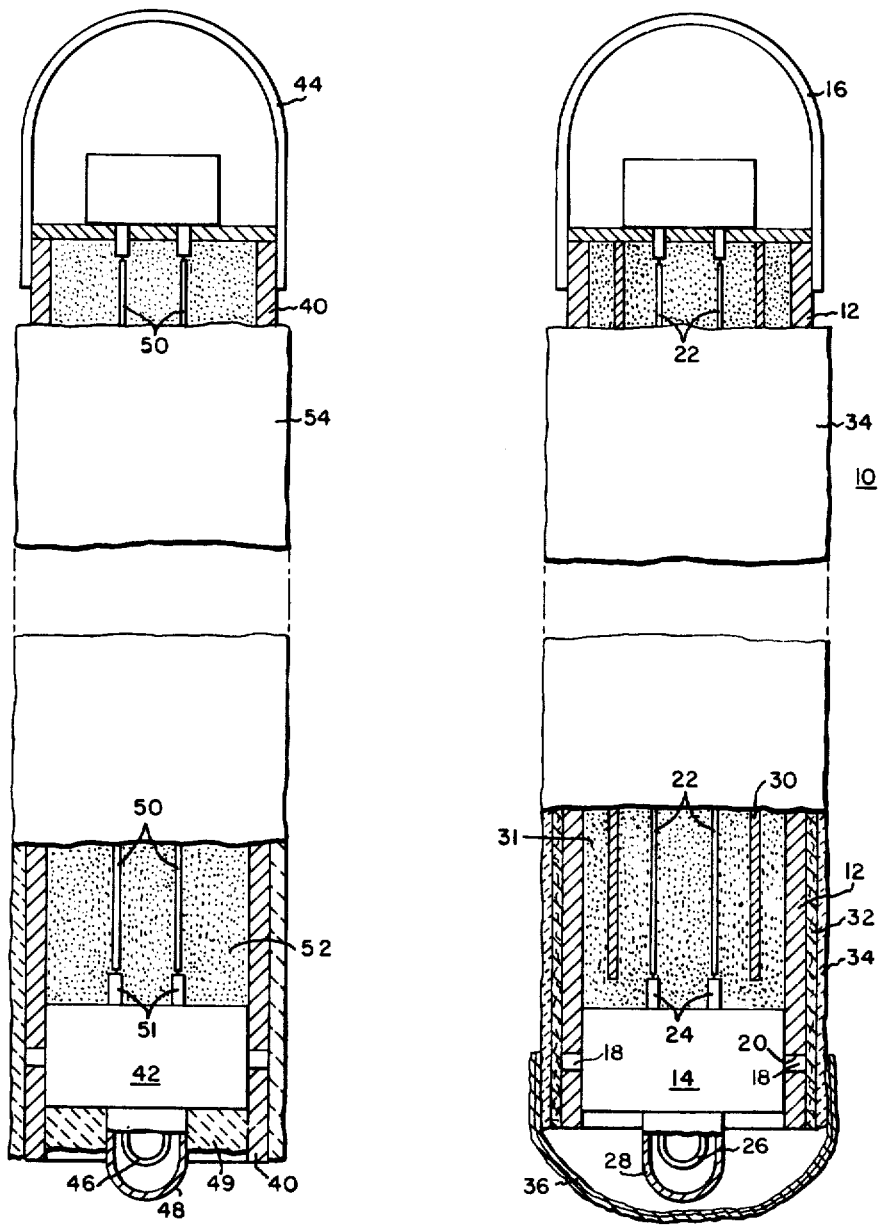

Thomas R. Acre, Lower Burrell, Pa., assignor to Allegheny Ludlum Steel Corporation, Brackenridge, Pa., a corporation of Pennsylvania
Filed Feb. 10, 1965, Ser. No. 431,681
Int. Cl. H01v 1/04
U.S. Cl. 136—234                                              1 Claim

ABSTRACT OF THE DISCLOSURE

An apparatus, having a disposable thermocouple, for continuously measuring the temperature of molten metal in a basic oxygen furnace without interrupting the flow of oxygen to the furnace.

---

This invention relates to an assembly for measuring the temperature of molten metal, and is especially useful in measuring the temperature of molten metal in a top blown basic oxygen furnace without interrupting the flow of oxygen thereto.

With the commercial advant of the basic oxygen furnace which employs the injection of oxygen onto the surface of a heat of steel, exceedingly high temperatures are encountered in the manufacture of steel having a low carbon content which temperatures are usually in excess of those heretofore normally obtained in the basic open hearth furnace, or in the carbon electrode electric arc furnace during commercial melting. Moreover, since it is desirable to automate the over-all process and control the same by computer, it becomes necessary to know as one of the important variables in the control of the over-all process, the temperature of the molten metal at any given time. Heretofore it has been found necessary to interrupt the flow of oxygen to the molten metal, remove the oxygen lance and hood, and thereafter turn down the furnace to obtain a temperature measurement employing an immersion type thermocouple. Another innovation which has been employed without interrupting the flow of oxygen to the molten metal involves the use of a so-called "drop" thermocouple in which weighted hot junction was placed in the chute used for adding additional slag and alloying components to the molten metal bath, and thereafter said weighted hot junction was dropped into the molten metal bath, the opposite end being connected to an external temperature recorder. Each of the foregoing means, however, suffered from various disadvantages. For example, the use of the "drop" type thermocouple did not permit the ready regulation of the position of the hot junction in the contents of the basic oxygen furnace. In addition, the accuracy and precision could not be verified and the cost of said thermocouple, which became dissipated within the molten metal bath, was quite high. On the other hand, the use of an immersion type thermocouple necessitated the interruption of the blowing of the oxygen onto the molten metal bath during the taking of such temperature measurements. Consequently, considerable cost was added to the over-all process, and it was noted that various inaccuracies in said temperature measurements were encountered when the melting process was interrupted. Moreover, with the use of disposable thermocouples the extension lead wires coming from the hot junction of the thermocouple required protection in order to prevent increasing the temperature of said lead wires to 100° F., or greater, during such readings for fear of introducing sufficient energy to result in inaccurate temperature readings being taken. In order to overcome these difficulties, the apparatus of the present invention is employed for more accurately and precisely measuring the temperature of the molten metal in a basic oxygen furnace without interrupting the flow of oxygen thereto.

An object of the present invention is to provide an apparatus which is suitable for measuring the temperature of molten metal.

Another object of the present invention is to provide apparatus which can employ a disposable thermocouple for measuring the temperature of molten metal in a basic oxygen furnace without interrupting the flow of oxygen thereto, said disposable thermocouple being connected to suitable conductors which are maintained at a temperature of less than 100° F.

A more specific object of the present invention is to provide a temperature measuring lance which can be lowered through an opening in the hood of a basic oxygen furnace for obtaining a sustained temperature reading at a desired position or depth of the molten metal bath without interrupting the flow of oxygen to said furnace during said temperature measurements.

Other objects of this invention will become apparent to those skilled in the art when taken in conjunction with the following description and the drawings in which:

FIGURE 1 is a schematic illustration of the apparatus of the present invention, and FIG. 2 is a schematic illustration of an alternate embodiment of the apparatus of the present invention.

Referring now to the drawings, and to FIG. 1 in particular, reference is directed to a temperature measuring lance, shown generally at 10, which comprises a substantially vertically extending hollow member 12 having a receptacle 14 disposed to be secured in one end thereof and terminating at the opposite end in a lifting bail 16. Preferably, the hollow member 12 is formed of black iron pipe which is easily machined, threaded or drilled in the event additional lengths are required. The receptacle 14 is one of any of the well-known commercially available receptacles for receiving and maintaining thermocouple units and is usually secured into one end of the hollow member 12 by means of pin 18 which extends through complementary, aligned openings 20 in the side walls of the hollow member 12 and the receptacle 14 for securing the same in fixed engagement within said one end of the hollow member 12. Conductor means 22 are connected to terminals 24 at an end of the receptacle 14 and extend upwardly throughout the length of the hollow member 12 and external thereof, and may be connected to any standard suitable recording instrument (not shown) for recording the actual temperature. The receptacle 14 is disposed to receive, in operative engagement, a disposable type of thermocouple which is removably secured therein and is provided with a hot junction 26 which is covered by a metallic protective sheath 28, the details of which are well known. In order to provide for maintaining the conductor means 22 at a temperature which does not exceed 100° F., it is desirable to fit the hollow member 12 with a concentric tube 30 which is made of heat dissipating material, for example copper. The heat dissipating tube 30 preferably extends throughout the greater portion of the length of the hollow member 12 and is disposed to surround the conductor means 22 for dissipating heat from said conductor means.

The hollow member 12 having the concentric tube 30 disposed therein may, in addition, be filled with an insulating refractory compound 31 for reducing the flow of heat inwardly to the conductor means 22. It will be appreciated that in the embodiment depicted in FIG. 1, it is not necessary to fill the hollow member 12 with such insulating refractory compound 31 since the embodiment illustrated in FIG. 1 is for taking a single temperature measurement only, and is not suitable for prolonged immersion within a basic oxygen furnace. As a result, the embodiment depicted in FIG. 1 can be utilized without the necessity of filling hollow member 12 with a refractory compound 31, and instead, the concentric tube 30 will usually suffice for dissipating any heat with the result that the conductor means 22 is maintained at some temperature of less than 100° F.

In the embodiment illustrated in FIG. 1, hollow member 12 is provided with suitable insulation in order to protect the hollow member 12 from the heat during the operation of said apparatus. This insulation may take the form of insulating sleeves 32 which are disposed to surround the hollow member 12 in frictional engagement, and for further protection the insulating sleeves may be coated with a refractory compound 34, such as, a slurry of alumina cement or zirconia mold coating which will further block the flow of heat inwardly, thus maintaining the conductors 22 at a temperature of less than 100° F. In practice it has been found that the insulating sleeves 32 may be made from cardboard which is highly effective in preventing the flow of heat inwardly.

Since the apparatus of the present invention is most useful in basic oxygen furnace wherein the steel being processed is covered with a molten slag, it is desirable to provide an expendable type of protection means 36 to encase the sheath and hot junction of the thermocouple until the desired position of the temperature measuring apparatus within the bath is obtained. It has been found that such protection can be afforded through the application of a plurality of laps or layers of a material, such as, aluminum foil, which are disposed to encase the thermocouple end of the hollow member 12. While aluminum foil has worked quite well, it has also been found that the use of masking tape or steel or any other expendable means which will not contaminate the metal bath and slag can be employed so long as said expendable means will dissolve within the contents of the furnace within a substantially short period of time. In practice, it has been found that two laps or layers of heavy gauge aluminum foil work sufficiently well as the protection means 36 to permit the insertion of the temperature measuring assembly into the furnace and immersing the same through the slag cover and into the molten metal bath for obtaining accurate and reproducible results within a period of up to eight seconds from the time the assembly first becomes immersed within the furnace contents.

It is recognized that with the use of the cardboard sleeves and the optional inclusion of a refractory coating thereon, the apparatus of the present invention can be utilized for a single temperature measurement at any desired depth of the bath contained within the basic oxygen furnace. On the other hand, where it is desired to take temperature readings over a prolonged period of time during which the temperature measuring assembly remains immersed within the molten metal bath and without interrupting the flow of oxygen to said basic oxygen furnace, the embodiment as illustrated in FIG. 2 is most useful.

The apparatus as shown in FIG. 2 comprises a substantially vertically extending hollow member 40 terminating at one end in a thermocouple receptacle 42 and at the other end in a lifting bail 44 similar to the apparatus as described in FIG. 1. The receptacle 42 is once again secured in said one end of the hollow member 40 by any suitable means and is disposed to receive a standard disposable type thermocouple having a hot junction 46 in operative engagement therein. The hot junction of the thermocouple is also provided with a special protective sheath 48, which sheath will withstand the high temperatures involved for periods of up to fifteen minutes immersion time. The space between the sheath 48 and the walls of member 40 may be advantageously filled with cement 49 so as to maintain the sheath in place to protect the thermocouple during prolonged immersion within the molten metal bath. As with the apparatus of FIG. 1, a pair of conductors 50 are provided which extend from the terminals 51 of the receptacle 42 upwardly and extending externally of the member 40 near the lifting bail 44 in any suitable manner for connecting the same to an externally disposed standard temperature recording device (not shown). The interior of the hollow member 40 is filled with an insulating refractory compound 52, such as, expanded alumina, which is disposed substantially throughout the length of said hollow member 40 and functions to maintain the temperature of the conductor means 50 at a temperature not in excess of 100° F. throughout the total immersion time of said temperature measuring apparatus. Since the embodiment as shown in FIG. 2 may also be constructed employing "black pipe" as the hollow member 40, it is further desirable to encase said hollow member 40 with a layer or coating 54 of refractory material, such as, a cement comprising about 70% alumina and about 30% silica, which is disposed to surround the apparatus throughout the substantially complete length thereof. Where the special thermocouple sheath 48 is formed of a cermet, such as is sold under the trade name "Metamic" and is disclosed in British Patent No. 562,404, and is used, it is not necessary to use an expendable means such as the means 36 of FIG. 1 because the thermocouple sheath will provide the requisite measure of protection until the desired position in the bath is attained.

In practice, the temperature measuring assembly of FIG. 1 is constructed with the hollow member 12 being formed of black pipe and the heat dissipating means 30 being a concentric copper tube which is disposed in spaced relation within the interior of said hollow member 12 being secured as by means of cross bracing (not shown) at the upper end thereof within the pipe 12. Conductor means 22 are placed within the copper tube 30 and are secured to terminals 24 of the receptacle 14 which is thereafter fixed in one end thereof by means of inserting pin 18 through the aligned openings 20. The other end of the conductor means is attached to any suitable external temperature recorder (not shown). Commercially available disposable thermocouple units having a junction 26 and a sheath 28 are used and are removably secured within the receptacle 14 being internally connected therein, when assembled, to the terminals 24 and from thence to the conductors 22. Cardboard sleeves 32 are next fitted to surround the hollow member 12 and the entire assembly is optionally coated with a layer of refractory compound which is permitted to cure before using. The apparatus as thus assembled may be attached to a winch by means of lifting bail 16 for immersion in the basic oxygen furnace. Before the assembly is lowered into the furnace, a plurality of laps or layers of expendable means 36 are disposed to surround the thermocouple end of the hollow member 12 before the entire apparatus is lowered into the basic oxygen furnace. In practice, two layers of aluminum foil have been found to be suitable for use as the expendable means 36 although it will be appreciated that this member may be varied somewhat depending upon the depth of the molten metal to the point where temperature measurements are desired and the temperature of the molten metal in which it is immersed. Upon lowering the assembly to a desired level, the furnace contents will destroy the expendable means, whereupon the molten metal will be in contact with the protective sheath of the thermocouple to thereby give the desired reading on the temperature recording instrument.

The apparatus of the present invention is unique from the standpoint that substantially the entire structure is reusable with the exception of the expendable means and the disposable type thermocouple which is employed. The readings taken are both accurate and precise and are invaluable in programming the over-all control of the basic oxygen furnace melting practice. Where prolonged temperature measurements are required, the embodiment of FIG. 2 has been found to be most satisfactory in operation so long as there is no break-down of the insulation or the refractory sleeve covering the hollow member. The tools have proved to be successful for providing the necessary information in order to obtain the requisite quality control requirements dictated by today's commercial standards.

I claim:

1. An assembly for measuring the temperature of molten metal in a basic oxygen furnace on an external temperature recorder without interrupting the flow of oxygen thereto comprising, in combination, a vertically extending hollow member having a receptacle secured in the lower end thereof and terminating at the opposite end in a lifting bail, conductor means disposed within the hollow member connecting the receptacle to the external temperature recorder, a disposable thermocouple means having a hot junction operatively disposed within the receptacle and connected to said conductor means, a thermocouple sheath disposed to encase said hot junction of the thermocouple means, insulating means disposed to fill the hollow member and surround the conductor means, a refractory covering disposed to encompass the hollow member and a heat dissipating member secure within said hollow member and extending substantially throughout the vertical length of said hollow member in spaced relation thereto.

References Cited

UNITED STATES PATENTS

| 2,584,615 | 2/1952 | Richards | 136—234 |
| 2,870,233 | 1/1959 | Comer | 136—233 |
| 2,994,733 | 8/1961 | Scadron | 136—235 X |
| 3,038,951 | 6/1962 | Mead | 136—234 |
| 3,277,716 | 10/1966 | Cox | 136—234 X |
| 3,288,654 | 11/1966 | Perrin et al. | 136—234 |
| 3,294,592 | 12/1966 | Fish et al. | 136—235 X |

FOREIGN PATENTS

| 956,324 | 4/1964 | Great Britain. |

ALLEN B. CURTIS, Primary Examiner

M. J. ANDREWS, Assistant Examiner